Figure 1:
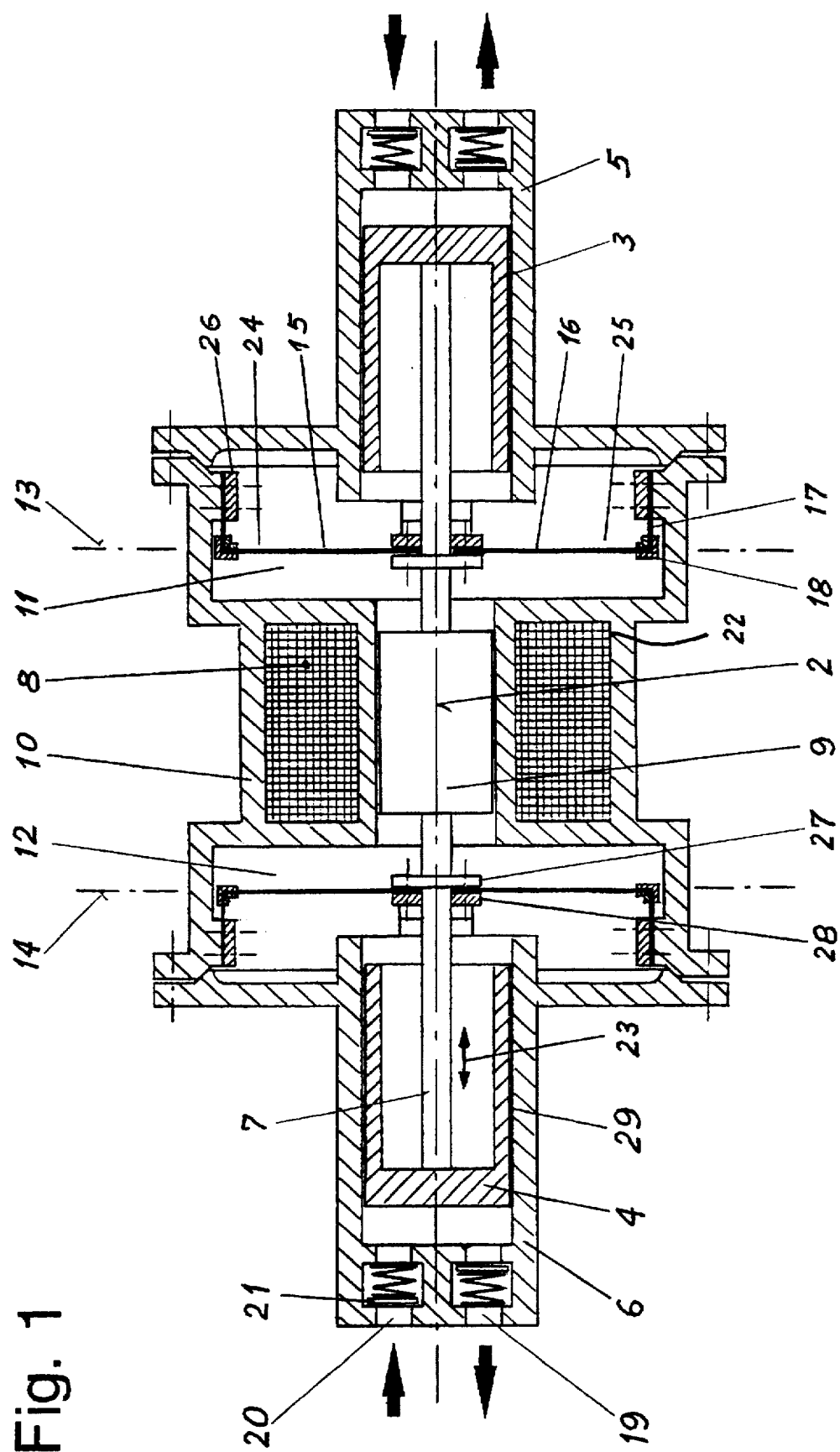

United States Patent [19]
Steiger

[11] Patent Number: 5,779,455
[45] Date of Patent: Jul. 14, 1998

[54] DEVICE FOR GUIDING AND CENTERING A MACHINE COMPONENT

[76] Inventor: Anton Steiger, Hornstrasse 28, CH-8308 Illnau, Switzerland

[21] Appl. No.: 669,504

[22] PCT Filed: Nov. 9, 1995

[86] PCT No.: PCT/CH95/00258

§ 371 Date: Jul. 10, 1996

§ 102(e) Date: Jul. 10, 1996

[87] PCT Pub. No.: WO96/15367

PCT Pub. Date: May 23, 1996

[30] Foreign Application Priority Data

Nov. 14, 1994 [CH] Switzerland .................. 3398/94

[51] Int. Cl.[6] .................. F04B 45/04; F16F 01/34
[52] U.S. Cl. .................. 417/418; 62/6; 267/161; 60/520
[58] Field of Search .................. 417/410.1, 415, 417/416, 417, 418; 60/517, 520; 310/15; 62/6; 267/161, 162, 163

[56] References Cited

U.S. PATENT DOCUMENTS 3,303,990  2/1967  Curwen .................. 417/418 X
5,011,379  4/1991  Hashimoto .................. 417/418 X

FOREIGN PATENT DOCUMENTS 0028144   6/1981   European Pat. Off. .
20958     2/1980   Japan .................. 267/161
4366040   12/1990  Japan .................. 267/161
2265674   6/1993   United Kingdom .

*Primary Examiner*—Ismael Izaguirre
*Attorney, Agent, or Firm*—Notaro & Michalos P.C.

[57] ABSTRACT

The device permits the precise guiding and centering of machine elements, for example of a piston rod (7) or a piston (3.4) in a cylinder (5.6). Therein two guides (11.12) are disposed at approximately right angles to the longitudinal axis (2) of the piston rod (7) and at a distance from each other. Each guide (11.12) comprises several spring elements (15) which extend radially from the axis (2). The spring elements (15) comprise long main spring parts (16) and short auxiliary spring (17). The spring parts (16,17) are rigidly connected one with the other via connection parts (18). The guides (11.12) have with respect to the axis (2) high transverse rigidity and permit precisely guided oscillating motions of the machine elements (3,4,5,6,7) along the longitudinal axis (2). These guides (11.12) permit for example the contact-free relative motions between piston (3.4) and cylinder (5.6) and have a high service life and operational reliability.

14 Claims, 6 Drawing Sheets

DEVICE FOR GUIDING AND CENTERING A MACHINE COMPONENT

The invention relates to a device for guiding and centering a machine element which carries out oscillating linear motions in the direction of its central axis, wherein the machine element is supported in a housing on two guides disposed at a distance with respect to one another in the direction of the central axis.

Among other things, such devices for guiding and centering a machine elementare used in vibration compressors. From DE-A1-30 30 711 is known a vibration compressor intended for refrigerators. In this known vibration compressor via a drive winding supplied with alternating current, and a magnet with a magnetic pole a piston is set into translational oscillating motions. This piston is supported in a cylinder liner which forms a slideway. In order to ensure the required function of the compressor, drive winding, piston and cylinder liner must be precisely aligned with respect to one another on the central axis which requires considerable constructional expenditures. In addition, the problem of sealing between piston wall and cylinder liner wall exists, which is solved in known manner through piston rings or by means of a gap seal or other known means. With high mechanical stress of the piston through transverse forces, often additional mechanical guides of the piston must be provided, which further exacerbates the problems of the central alignment and causes high requirements made of the manufacturing precision and therewith high costs, wherein during operation wear and tear occurs nevertheless at the guidance and centering arrangements. The occurrence of sliding friction demands further the use of a lubricant such as oil or grease. This wear-and-tear can interfere considerably with the operation of the compressor since material abrasions mixed with lubricants can be intrained in the coolant circulation, or the functional capacity and the performance of the compressor decreases considerably. In particular in the case of arranging gap seals, long guidance and centering ranges are necessary leading to a greater material expenditure and corresponding constructional implementation. The longer the guidances the more difficult it becomes, however, to center these so that between piston wall and cylinder liner wall no contact and wear-and-tear takes place.

Pistons, which carry out oscillating linear motions along a central axis, are also used in free-piston motors, for example Stirling motors. In this case similar known solutions are also employed such as have been discussed in connection with the known oscillating compressors. In the process the same difficulties are encountered wherein contact-free sealing surfaces between piston and cylinder wall, if at all, can only be attained with very high expenditures and correspondingly high costs. Because of the difficult operating conditions, nevertheless, again and again abrasions occur between the moving machine elements whereby operation of such free-piston motors is strongly disturbed and maintenance-free service life is considerably reduced. For very small free-piston arrangements in heart replacement pumps, from the publication "Stirling-Engines", G. Walker, Clarendon Press 1980, pages 404 and 405, devices are known which are said to support retain the free piston without contact in the cylinder liner with the aid of springs. One of the solutions provides that strap-form springs are connected at the outer ends with the piston and are secured in the central region on the cylinder head. Such bent-over spring bands, however, cannot in practice be produced with the desired quality and uniformity which would ensure the desired precise guidance of the piston in the cylinder. In particular the bending-over of the strap ends connected with the piston leads to considerable difficulties, and in this region damages occur very often. In principle, this implementation would allow the oscillation of the piston, however is not capable of ensuring the requirements made of the precision and reliability of the guidance and centering. As a further solution the use of helical plate springs is suggested in the same publication. Such helical plate springs have been used in combination with additional mechanical centering systems, occasionally also in relatively large Stirling free-piston motors. However, such springs have too low a transverse rigidity which is the reason why in practice the precise centering very often is not ensured so that damage and disturbances occur repeatedly. Therefore this suggestion also is not capable of solving satisfactorily the problem of guiding and centering a machine element in the form of a piston which carries out oscillating linear motions in the direction of the central axis.

The present invention addresses the problem of creating a device for guiding and centering a machine element, which permits oscillating linear motions in the direction of the central axis, however has a very high rigidity at a right angle to the central axis, and prevents that the moved machine element deviates from its position on the central axis. The device should be simple and maintenance-free in construction and it should be possible to produce and install the device with constant precision and constant characteristics. The device should permit being able to guide machine elements moved under linear oscillation so as to be free of contact and without lubricants in other machine elements, for example as piston/cylinder or rotor/stator arrangements in linear motors.

This problem is solved through the characteristics defined in the characterizing clause of patent claim 1. Advantageous further developments of the invention are evident based on the characteristics of the dependent claims.

In the device according to the invention each of the two guides disposed at a distance from one another comprises several plate-form spring elements. The suggested arrangement of the guides with the spring elements yields the advantage that the machine element which carries out oscillating linear motions, is centered precisely and guided on its central axis. The guides do not have any parts which move against one another and are subject to wear-and-tear due to friction. The machine element is guided and centered by the two guides so that it can carry out a relative motion without contact relative to other machine elements, for example in a piston/cylinder arrangement in a pump or a linear motor, or in electric linear generators with oscillating motion. The spring elements of the discrete guides are disposed in a plane which is approximately at right angles to the central axis of the oscillatingly moved machine element. In this plane are disposed the main spring parts which are implemented in the form of plates. This arrangement of the main spring parts permits the calculation of the motion and spring data in known manner so that the motions of the machine element can also be determined accurately. In the outer region of the long main spring parts shorter auxiliary spring parts are disposed, and specifically at right angles to the main spring parts so that these auxiliary spring parts extend approximately parallel to the central axis. The connection of the auxiliary spring parts with the main spring parts takes place via an additional connection element equipped with corresponding fastening means for the fixed connection of the ends of the main and auxiliary spring parts. By disposing this additional connection element between each auxiliary spring part and the associated main spring part the advantage is attained that the spring element is rigid in the bent-over region and the deformations of the spring elements take place only in the plate-form regions. The individual auxiliary spring parts and main spring parts was well as the connection elements can be produced with great precision according to the technical specifications so that after installation they have the desired values with respect to dimensional accuracy as well as also stability. This precise agreement with given dimensions and stability values can be achieved with conventional production methods since the spring parts and the connection elements are of simple forms. The individual parts can, moreover, be tested simply and parts which deviate from the standard data can be eliminated readily. Assembling each spring element from several individual spring parts permits adaptation to differing requirements and entails the considerable advantage that no parts of the spring elements need to be deformed, for example bent. The plate-form shaping of the individual spring element parts permits at any time the precise working to the desired dimensions, for example by grinding. In the normal case the main and the auxiliary spring parts are planar plates.

The plate-form spring elements of each guide are usefully disposed centrally symmetrically so that from the central axis in the plane of the guide four, six or more spring element parts extend radially outwardly. Disposing odd numbers of spring element parts in the plane of the guide is possible, however each spring element comprises usefully one main spring part which extends symmetrically on both sides of the central axis. Thereby that between the spring elements in one plane angles of equal value are formed, the advantage results that the machine element is centered precisely symmetrically on the central axis.

The dimensions of the long main spring parts and of the short auxiliary spring parts are chosen in known manner to be such that the rigidity of the two guides which form the guiding device is at least greater by the factor 100 in the direction of the central axis than transversely. Depending on the desired guidance precision and the occurring transverse forces, guides with a rigidity ratio of 500 and more are used. In the device according to the invention further advantages are attained thereby that the force absorption, the rigidity or the motion paths can be changed by adapting the individual spring element parts. For example the rigidity ratio can not only be changed by changing the dimensions of the plate-form spring parts but also thereby that at least two auxiliary spring parts or main spring parts are disposed at a distance parallel with respect to one another, or the auxiliary as well as also main spring part are implemented thus. If no change of the spring constants is desired, two groups of plate-form spring elements can be disposed in one guide in two planes disposed at a distance from each other. This leads to an increase of the bearing capacity of the corresponding guide at approximately constant rigidity ratio. With all of these different arrangements and embodiments the same basic elements of main spring parts, auxiliary spring parts and connection elements can always be used so that the foundations for calculation are simplified and the fabrication of the individual parts is considerably easier. A further advantage resides therein that the main spring part of the individual spring elements can be implemented as a single part or be comprised of two parts.

If the guide is disposed at the end of an axis [axial element], it can be of advantage to implement the main spring parts integrally since in that case they can be connected with the axis [axial element] with the aid of a central connection element. However, if the guide is disposed somewhere in the axis region of the machine element it is often useful to implement the main spring parts in two parts and subsequently to connect with the axis [axial element] the inner ends, directed toward the central axis, of the main spring parts through corresponding fastening means. Apart from the flange connection, suggested according to the invention, with specially formed clamping element, other known force-fit connections can also be used.

Special advantages result if the linearly oscillatingly moved machine element is a piston and/or a piston rod of a free-piston motor, for example a Stirling motor. With the guide according to the invention it is possible to guide the working piston as well as displacement piston in their cylinder precisely in the center and free of contact so that it becomes possible to use gap seals having a very small gap width. The use of two identical guides, which are disposed at a space one from the other, guides the corresponding piston or the piston rods in their oscillating linear motions precisely along the central axis, and disturbing deviations from the motion are largely avoided. The desired motion paths of the oscillating linear motion can be adapted in a wide range to the requirements by adapting the dimensions of the spring parts. The same advantages are also obtained if the moving machine element is a piston rod and/or a piston of a compressor wherein the latter comprises an electric drive generating linear oscillating motions. Therein implementations acting simply or doubly are possible.

Figure 2:
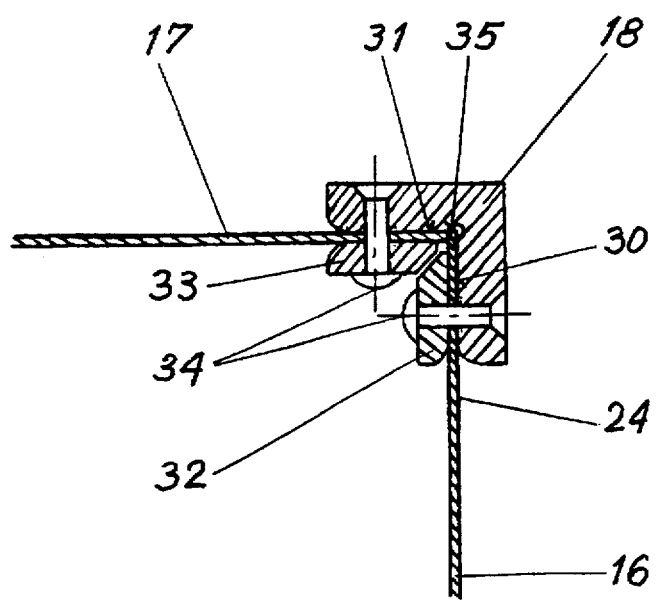
Figure 3:
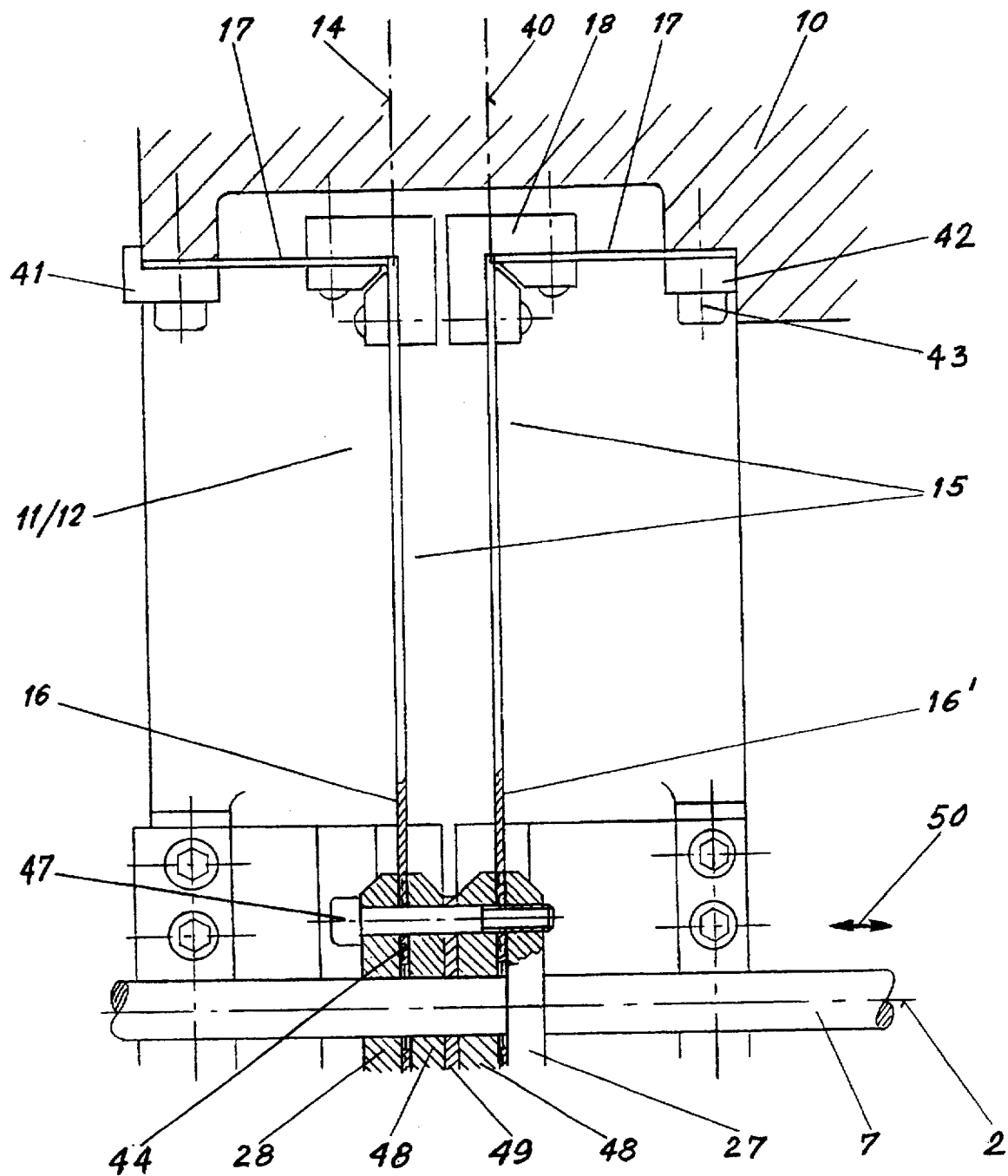
Figure 4:
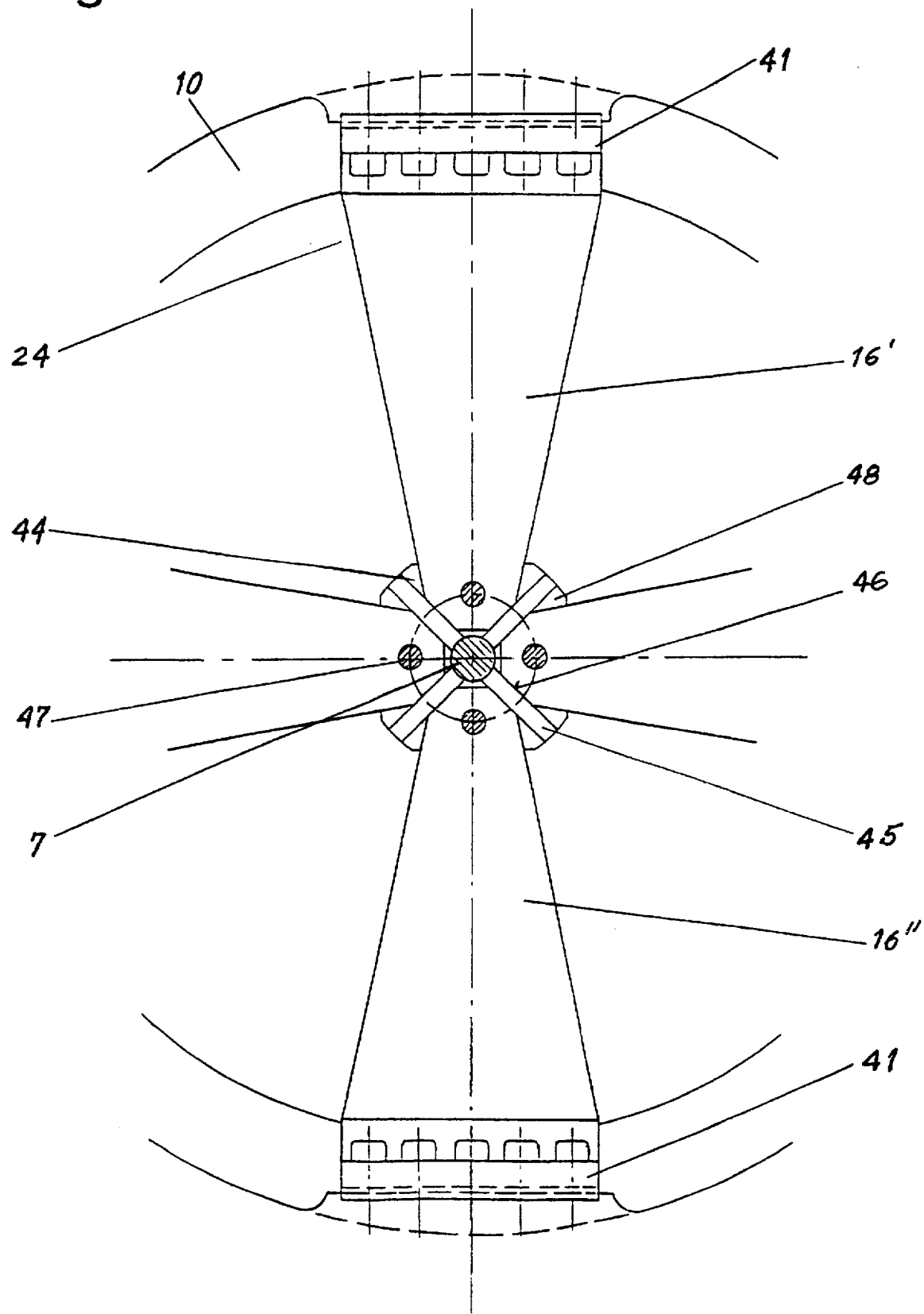
Figure 5:
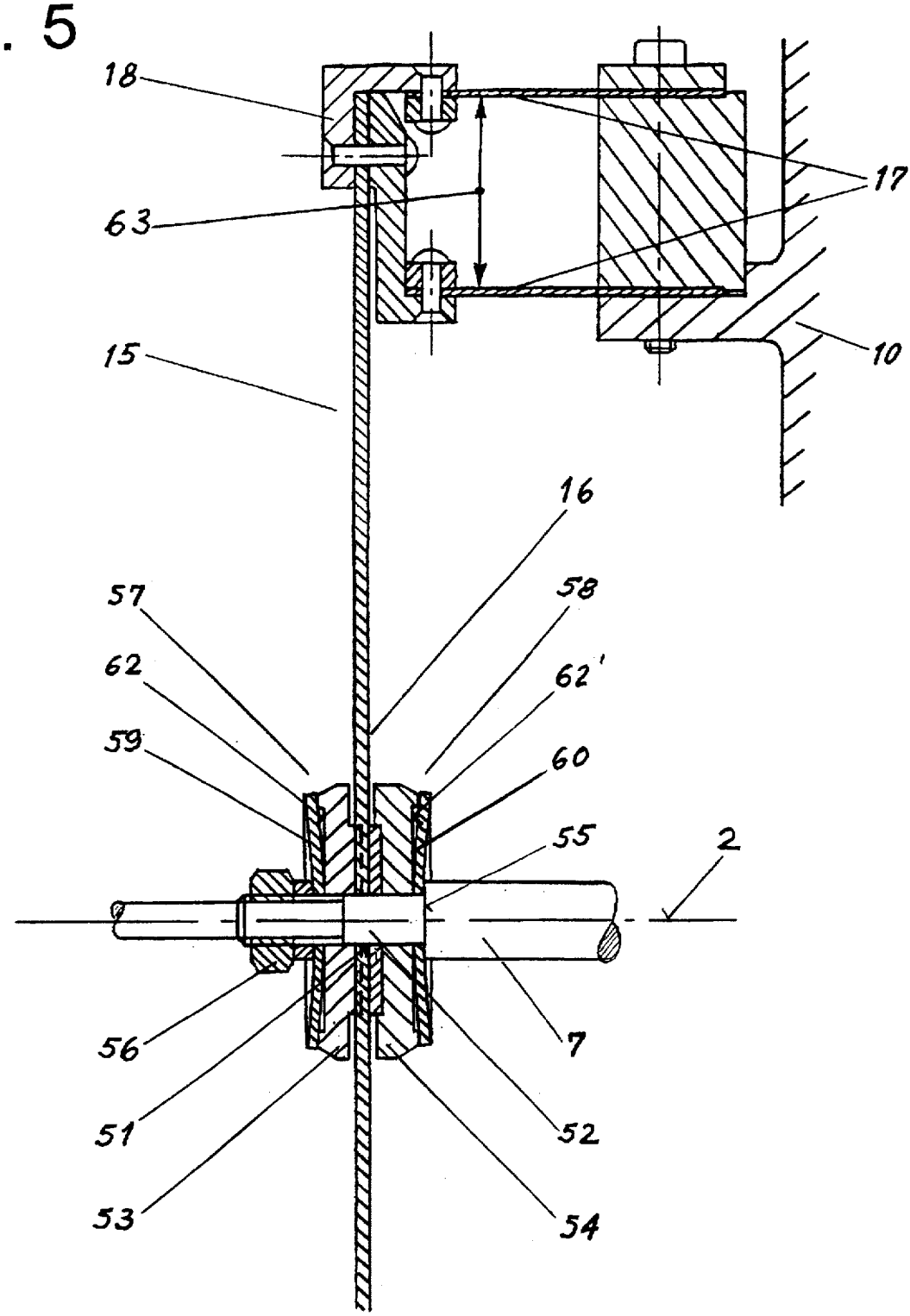
Figure 6:
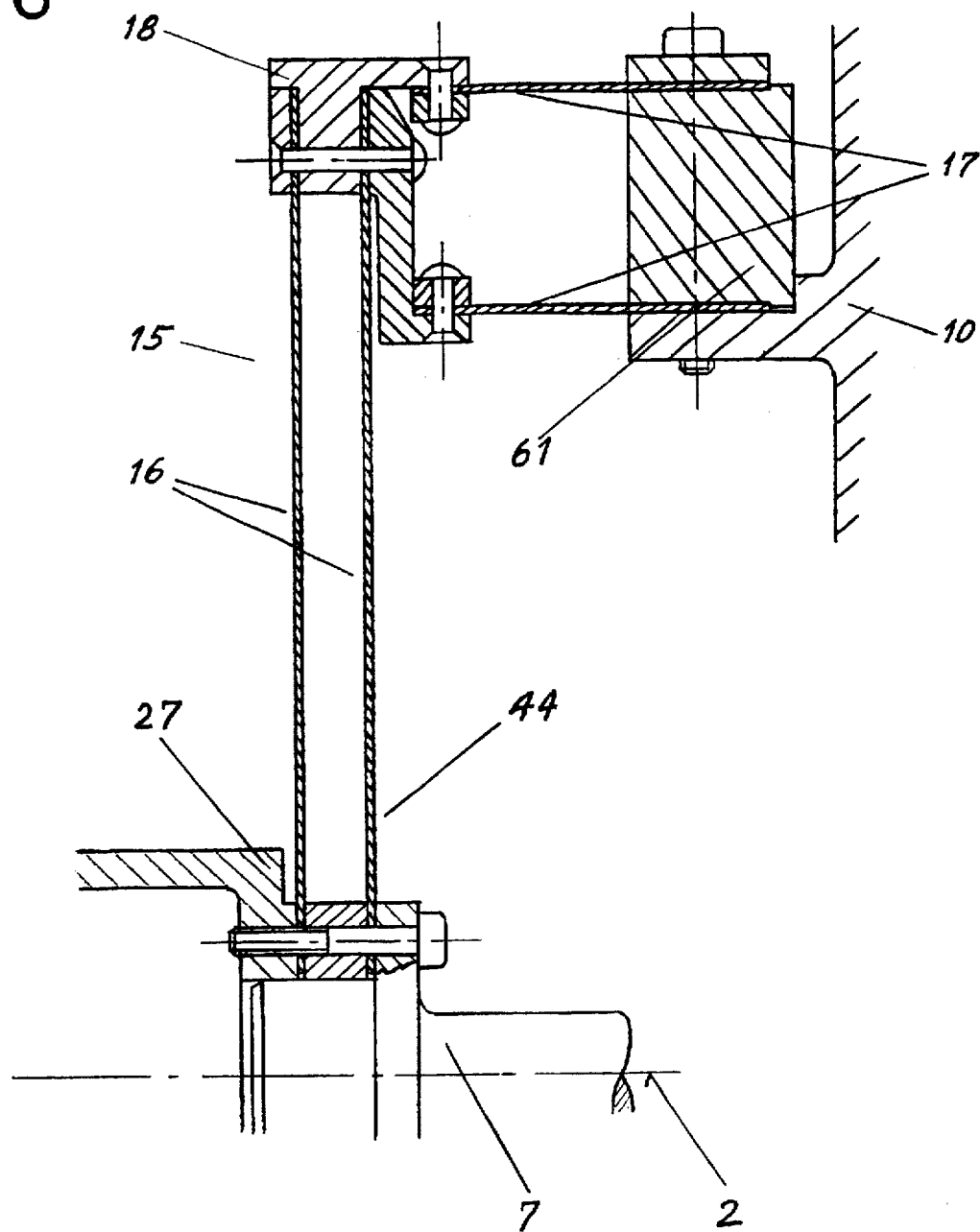

In the following the invention will be explained in further detail with the aid of drawings representing embodiment examples. Therein show:

FIG. 1 a longitudinal section in schematic representation through a piston compressor with linear oscillating electric drive, FIG. 2 a detail from a spring element with the connection element between main and auxiliary spring part, FIG. 3 a detail from a guide with a doubling of the spring elements with two-part main spring parts, FIG. 4 the arrangement according to FIG. 3 in partial front view, FIG. 5 a schematic representation of the central fastening of a single-part main spring part with pairs of auxiliary spring parts, and FIG. 6 a detail of a guide with two-part main spring parts and main and auxiliary spring parts disposed in pairs.

The compressor 1 depicted in FIG. 1 as a horizontally opposed engine arrangement comprises two pistons 3, 4 cooperating with cylinders 5, 6. These cylinders 5, 6 are component parts of a housing 10 of the compressor 1. The two pistons 3, 4 are each disposed at the ends of a piston rod 7 wherein the piston rod 7 and the pistons 3, 4 have a central axis 2 which forms simultaneously the longitudinal axis of the housing 10. Between pistons 3, 4 is fastened on the piston rod 7 a magneto armature 9 encompassed by a coil 8. This coil 8 is supplied via a line 22 with ac current whereby the magneto armature 9 is set into oscillating linear motions along the central axis 2 in the direction of arrows 23. Via the piston rod 7 pistons 3 and 4 are also set into oscillating working motions. At the ends of cylinder 5, 6 pressure lines 19 and intake lines 20 with valves 21 are disposed via which the intake and expulsion of a pressure medium is controlled. The piston rod 7 and therewith the pistons 3 and 4, as well as the magneto armature 9 are guided and centered via guides 11, 12. These guides 11, 12 are oriented in two planes 13, 14 which are at approximately right angles to the central axis 2. The two planes 13, 14 and therewith the two guides 11, 12 are spaced at a distance from each other in the direction of the central axis 2 wherein this distance is determined by the bearing conditions as well as the constructional conditions of the compressor.

Each of the two guides 11, 12 comprises several spring elements 15. These spring elements 15 comprise a two-part long main spring part 16 as well as two short auxiliary spring parts 17 which are rigidly fastened at the outer ends 24, 25 of the main spring part 16 and connected with the housing 10. Therein the auxiliary spring parts 17 are disposed at approximately right angles to the main spring part 16 and extend thus approximately parallel to the central axis 2. The rigid connection between the outer ends 24, 25 of the main spring part 16 and the auxiliary spring parts 17 is established by means of connection elements 18. The spring elements 15 are firmly connected, on the one hand, via the auxiliary spring parts 17 and the fastening elements 26 with the housing 10 and, on the other hand, via the main spring parts 16 as well as a flange 27 and clamping element 28 with the oscillating moved machine element, i.e. the piston rod 7 and the pistons 3, 4. The two guides 11, 12 are therein implemented precisely identically, however, as is evident in the Figure, are disposed mirror symmetrically inverted.

With the aid of these guides 11, 12 according to the invention the pistons 3, 4 can be guided in the bores of cylinders 5, 6 so as to be free of contact. The guiding and centering is therein so precise that between pistons 3, 4 and cylinders 5, 6 only a very narrow gap 29 is necessary. This permits sealing the piston volume with contact-free gap seals and not seals are necessary and present which could be abraded or worn through relative motions. The spring system formed by the spring elements 15 of each guide 11, 12 is implemented so that the rigidity in the direction of planes 13, 14 is at least greater by the factor 100 than is its rigidity in the direction of the central axis 2. In the example depicted in FIG. 1 the rigidity transversely to the central axis 2 is approximately 200-fold higher than in the direction of the central axis 2. To this end spring parts of hardened spring steel having a thickness of 1.18 mm are used. For each guide 11, 12 are available two spring elements 15 which are disposed at right angles to each other and which each comprise two main spring parts 16 and two auxiliary spring parts 17. The main spring parts 16 have a length of approximately 13 cm and the auxiliary spring parts a length of approximately 2.2 cm. This permits a piston stroke of 20 mm. The piston diameter is 45 mm and the oscillation frequency 50 oscillations per minute [SIC: second? see H58011, where it is "per second"].

FIG. 2 shows the connection region between the outer end 24 of a long main spring part 16 and a short main spring part 17 on an enlarged scale. The connection element 18 is therein implemented as an angle element and has two positioning surfaces 30, 31 directed at right angles to each other. These positioning surfaces 30, 31 serve as supports for the end regions of the main spring part 16 as well as of auxiliary spring part 17. In the example depicted the positioning surface 31 serves simultaneously as stop face for the outer edge 35 of the long main spring part 16. The outer edge of the auxiliary spring part 17 is, in turn, pushed against the face of the main spring part so that the positions of the two spring parts 16, 17 within the connection element 18 are determined precisely. The main spring part 16 and the auxiliary spring part 17 are force-fittingly connected with each other via the connection element 18 and the corresponding clamping means 32, 33. In the example shown the force-fit is generated by rivets 34, wherein this connection can also be replaced by a screw connection. The transition regions from the clamping region into the free region of the spring parts 15, 17 are implemented in known manner so that no damage of the spring elements occurs for example by rounding-out the edges or suitable coatings of the clamping plates 32, 33 or of the connection element 18.

FIGS. 3 and 4 show a guide 11 or 12 which in principle corresponds to the arrangements according to FIG. 1 and 2. However, at each guide two planes 14, 40 spaced at a distance from each other are present, in which the long main spring elements 16', 16" of spring elements 15 are disposed. The two planes 14, 40 extend therein parallel to one another and at approximately right angles to the central axis 2 of the piston rod 7. In FIG. 4 is evident that in each of the planes 14, 40 two spring elements 15 are disposed which are at right angles to each other and in which between the main spring parts 16 equal angles are formed. Each of the spring elements 15 therein comprises two main spring parts 16', 16", two auxiliary spring parts 17 and two connection elements 18. The ends facing away from the connection elements 18 of the short auxiliary spring parts 17 are rigidly fastened to the housing 10 of the machine by means of fastening elements 41, 42 and screws 43. The piston rod 7, which is a component of the linearly and oscillatingly moved machine element, here also comprises a flange 27 as well as a clamping element 28 which serves for connecting the inner ends 44 of the main spring parts 16', 16" with the flange 27. The short auxiliary spring parts 17 are formed of flat, rectangular plates. The main spring parts 16 are trapezoidal and wider toward the outer end 24 than at the inner end 44. The form of spring parts 15, 17 is determined in known manner by the desired spring characteristics. On the centering plates 48 ribs 45 are disposed which form stop faces 46 for the inner ends 44 of the main spring parts 16', 16". Through these ribs 45 and the corresponding stop faces 46 as well as the corresponding forming of the inner ends 44 of the main spring parts 16, their position relative to the centering plates 48 or the piston rod 7 is precisely determined. In this position the inner ends 44 or the main spring parts 16 is clamped and secured with the aid of the two centering plates 48, the clamping element 28, as well as a spacer disk 49 and screws 47. This arrangement shown in FIG. 3 and 4 of a guide 11 or 12 can accept relatively large longitudinal and transverse forces, but for the remainder permits the same sequence of motion as are described in connection with FIG. 1. In particular the freedom of the linear oscillating motion of the piston rod 7 and of the associated machine element in the direction of arrow 50 is ensured. This embodiment of the two-part main spring parts 16 is in particular useful wherever on the central axis 2 before and after the guides 11 or 12 further machine elements are disposed which do not permit placing contrinuous spring elements 15 onto the piston rod 7. Furthermore, production of the main spring parts 15 is facilitated since they have small dimensions and, if needed, individual parts of a spring element 15 can also be exchanged.

FIG. 5 depicts a guide in which the oscillatingly moved machine element or the piston rod 7 is supported and guided at the end. The guide therein comprises two spring elements 15 which are disposed at right angles to each other and, again, in a plane at right angles to the central axis 2. Each of the spring elements 15 comprises a continuous main spring part 16 which radially intersects the central axis 2. At the outer ends 24 of the main spring parts 16 again connection elements 18 are disposed wherein these however in the example shown in FIG. 5 comprise support and positioning faces for two parallel short auxiliary spring parts 17. Accordingly, on housing 10 also two contact surfaces for the two auxiliary spring parts 17 disposed at a distance one from the other, are present and the ends are, again with the aid of clamping elements, fixedly connected with the housing 10. The connection between the auxiliary spring parts 17 and the main spring part 16 takes place analogously, however adapted in the manner described in connection with FIG. 2, so that in the transition region between the auxiliary spring parts 17 and the main spring part 16 a rigid connection is generated. Each of the main spring parts 16 has in its central region a bore 51 which fits form-fittingly on the terminal pin 52 of the piston rod 7. On both sides of the main spring parts 16 clamping elements 53, 54 are present which are implemented in the form of disks. On the piston rod 7 a stop flange 55 is formed for positioning and the terminal pin 52 includes a screw coupling 56 with which the clamping elements 53, 54 and the main spring parts 16 can be clamped in and secured. In this type of connection of the main spring parts 16 with the oscillatingly moved machine part, in this case the piston rod 7, it must be ensured that the main spring parts are secured with the greatest force in the region of exit from the mountings of the clamping elements 53, 54. For this purpose the sides 57, 58 facing away from the main spring parts 16 of the clamping elements 53, 54 are provided with central depressions 62, 62' and on these sides 57, 58 subsequently additional clamping disks 59, 60 are disposed. Thereby the tension force generated by the screw coupling 56 through the elastic deformation of the clamping disks 59, 60 is directed to the outer regions of the clamping elements 53, 54 and therewith the main spring parts 16 are also clamped faultlessly in these outer regions.

The arrangement depicted in FIG. 5 of parallel auxiliary spring parts 17 permits a significant increase of the transverse rigidity which can be positively influenced through an increase of the distance 63 between the spring parts 17. The arrangement of an auxiliary spring part 17 according to FIG. 1 or 2 represents the simplest embodiment.

In FIG. 6 a further embodiment of a guide according to the invention is shown wherein in each spring element 15 the main spring parts 16 as well as also the auxiliary spring parts 17 are disposed in pairs parallel and at a distance from one another. The connection element 18 between the outer ends of the main spring parts 16 and the ends abutting thereon of the auxiliary spring parts 17 is implemented correspondingly and includes support surfaces for the arrangement in pairs of the parallel springs. To connect the auxiliary spring parts 17 with the housing 10 corresponding fastening and clamping elements 61 are available. The implementation of the guide with parallel springs 16 leads to a spring characteristic symmetrical in both longitudinal directions of motion with a correspondingly more favorable tension curve. Due to the bending and force conditions in the clamping-in regions the simple spring does not have during the forward or backward motion of the machine element the same spring characteristic. In relation to the zero point the positive and the negative characteristic of the simple spring are not symmetrical.

In the embodiment according to FIG. 1, as well as also in the embodiment according to FIGS. 3 and 4, it is found to be useful to dispose in each of the planes 13, 14 or 40 at least two spring elements 15 which are formed centrally symmetrical with respect to the central axis 2 and intersect at an angle of 90°. If the construction conditions and the forces occurring require this, the spring elements can however also be disposed at an angle of 60° or 45° with respect to one another. Accordingly, in the region of the oscillatingly moved machine element 7 and on housing 10 subsequently more fastening and positioning points are provided. Independently of the various possible implementations of the guide these ensure the precise centering of the linearly oscillatingly moved machine element 3, 4, 7 along the central axis 2 and a reduction of the deviations from this central axis 2 as a consequence of transverse forces which makes possible minimum gaps between the moved machine parts and consequently permits contact-free gap seals.

I claim:

1. Device for guiding and centering a machine element (4, 7) which carries out oscillating linear motions in the direction of its central axis (2), wherein the machine element (4, 7) is supported in a housing (10) on two guides (11, 12) disposed in the direction of the central axis (2) at a distance one from the other, characterized in that each of the two guides (11, 12) comprises several plate-form spring elements (15) which are disposed in a plane (13, 14) at approximately right angles to the central axis (2) of the machine element (4, 7), each of the spring elements (15), on the one hand, is fixedly connected in the region of the central axis (2) with the machine element (4, 7) and, on the other hand, in the region of the outer ends of the spring elements (15) with the housing (10), each of the spring elements (15) including at least one long main spring part (16) which is disposed in the plane (13, 14) at right angles to the central axis (2) and at each end directed toward the housing (10) at least one short auxiliary spring part (17) which is disposed approximately parallel to the central axis (2), between each auxiliary spring part (17) and the associated main spring part (16) a connection element (18) is disposed, and the auxiliary spring parts (17) are rigidly connected via these connection elements (18) with the outer ends (24, 25) of the main spring parts (16).

2. Device as stated in patent claim 1, characterized in that each of the two guides (11, 12) comprises at least two centrally symmetrical spring elements (15) which are disposed in a plane (13, 14) at right angles to the central axis (2) of the machine element (3, 4, 7), and radially intersects this central axis (2) wherein between the spring elements (15) identical angles are formed.

3. Device as stated in patent claim 1, characterized in that the rigidity of the guidance device formed by the two guides (11, 12) is greater by at least the factor 100 transversely to the central axis (2) than in the direction of the central axis (2).

4. Device as stated in patent claims 1, characterized in that at least one of the guides (11, 12) has two planes (14, 40) with spring elements (15), wherein these planes (14, 40) extend parallel and in the direction of the central axis (2) at a distance one from the other as well as at right angles to the central axis (2).

5. Device as stated in patent claims 1, characterized in that each spring element (17) comprises a one-piece main spring part (16) with central connection elements (51) to the machine element (7, 52) and at least an auxiliary spring part (17) disposed on the two ends of the main spring part (16).

6. Device as stated in patent claims 1, characterized in that each spring element (15) comprises a two-piece main spring part (16), wherein the inner ends (44) of the two main spring parts (16', 16"), directed toward the central axis, are connected fixedly with the machine element (7, 27) and at each of the outer ends (24) of the two main spring parts (16) is disposed at least one auxiliary spring part (17).

7. Device as stated in patent claims 1, characterized in that each of the spring elements (15) comprises a one or multi-piece main spring part (16) and two pairs of parallel auxiliary spring parts (17) each.

8. Device as stated in patent claims 1, characterized in that each of the spring elements (15) comprises one pair of parallel single or multi-piece main spring parts (16) and two pairs of parallel auxiliary spring parts (17).

9. Device as stated in patent claims 1, characterized in that the connection element (18) disposed between the main spring part (16) and each auxiliary spring part (17) of the spring elements (15) is an angle element and this angle element comprises positioning faces (30, 31) and clamping means (32, 33) for the force-fit mounting of one of the end regions of the main and auxiliary spring parts (16, 17).

10. Device as stated in patent claim 9, characterized in that the angle element comprises a positioning part (36) with support and stop faces (30, 31) disposed at right angles to each other, as well as force plates (32, 33), the end regions of the main and auxiliary spring parts (16, 17) are emplaced between one force plate (32, 33) and one support face (30, 31) on the positioning part (36), and for the force-fit mounting of the end regions of the spring parts (16, 17) between the positioning part (36) and the force plates (32, 33) screws or rivets (34) are available.

11. Device as stated in patent claims 1, characterized in that the regions (44) of the main spring parts (16) of the spring elements (15), disposed in the region of the machine element (7), are fixed on a flange (27) connected with the machine element (7), wherein the flange (27) comprises support faces and stop faces (45) for these regions (44) of the main spring parts (16) and these regions (44) are held between clamping elements (48) and the flange (27) with the aid of screws (47).

12. Device as stated in patent claim 5, characterized in that the main spring parts (16) are disposed in the region of the central axis (2) between clamping elements (53, 54), these clamping elements (53, 54) include on the side (57, 58) facing away from the main spring parts (16) a central depression, at this sides planar clamping disks (59, 60) rest and these clamping disks (59, 60) are elastically deflected through a central screw coupling (56) of the machine element.

13. Device as stated in one of patent claims 1, characterized in that on a Stirling free-piston motor at least one of the pistons and/or one of the piston rods form such linearly oscillatingly moved machine element and the two associated guides are supported in the housing of this Stirling free-piston motor.

14. Device as stated in one of patent claims 1, characterized in that the linearly oscillatingly moved machine element is a piston rod (7) and/or a piston (3, 4) of a compressor (1) with linearly oscillating drive (8, 9) and the two guides (11, 12) are supported in the housing (10) of this compressor (1).

* * * * *